United States Patent [19]
Covey

[11] 3,916,715
[45] Nov. 4, 1975

[54] INSERT (SUBSTITUTE) DRIVE GEARS TO PRODUCE FAST RETRIEVE IN CERTAIN FISHING REELS

[76] Inventor: Leslie V. Covey, Highway 265, Box 835, Branson, Mo. 65616

[22] Filed: Jan. 25, 1974

[21] Appl. No.: 436,660

[52] U.S. Cl. .................. 74/414; 242/84.1; 242/211
[51] Int. Cl.² ..................... F16H 1/06; A01K 89/00
[58] Field of Search .............. 242/211, 84.1; 74/414

[56] References Cited
UNITED STATES PATENTS

| | | | |
|---|---|---|---|
| 2,204,125 | 6/1940 | Dayton | 242/84.1 R |
| 2,613,044 | 10/1952 | Zetts | 242/211 |
| 3,089,663 | 5/1963 | Kirby, Sr. | 242/84.1 R |

Primary Examiner—Leonard H. Gerin
Attorney, Agent, or Firm—Thomas M. Scofield, Esq.

[57] ABSTRACT

Improvements in Ambassadeur 5000 and 6000 Series reels of the Garcia Corporation of Teaneck, New Jersey which enable transformation of same from slow retrieve to fast retrieve reels by mere substitution of two gears therein; novel and improved insert and substitute pinion and drive gears for such reels; methods of manufacture of an improved pinion gear construction of very small scale utilizing a reinforcing collar; an improved, integral pinion gear, shaft and clutch configuration.

4 Claims, 9 Drawing Figures

U.S. Patent  Nov. 4, 1975  3,916,715
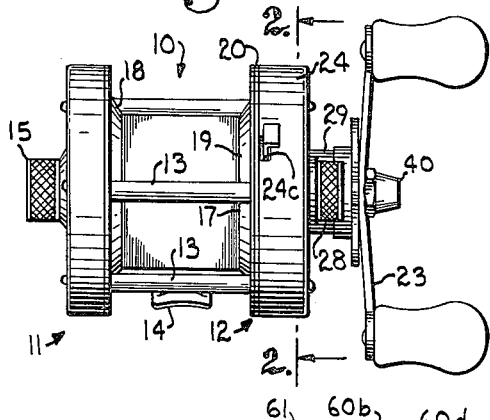
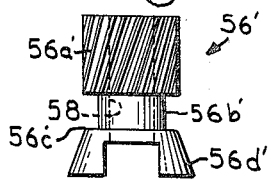
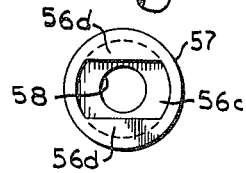
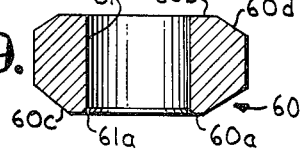
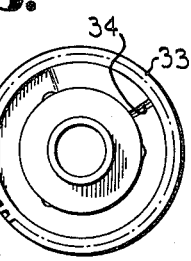
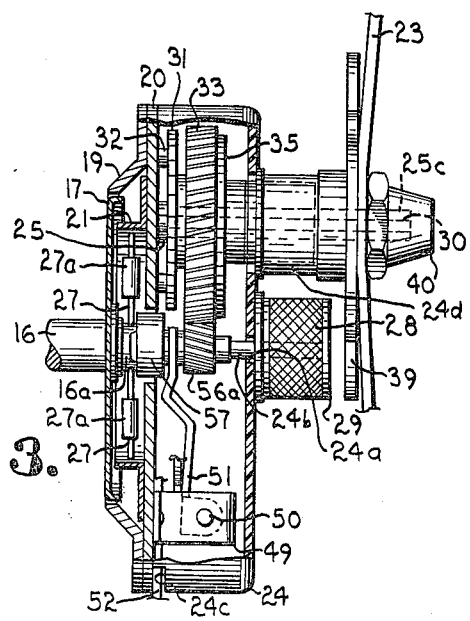

INSERT (SUBSTITUTE) DRIVE GEARS TO PRODUCE FAST RETRIEVE IN CERTAIN FISHING REELS

BACKGROUND OF THE INVENTION

The Ambassadeur 5000 and 6000 Series of bass fishing reels manufactured in Svangsta, Sweden by ABU Aktiebolag and sold in the United States by the Garcia Corporation of 329 Alfred Avenue, Teaneck, N.J., comprise the very cream of the bass fishing reels available to the public and bass fishing fraternity. Literally millions of these reels have been sold to bass fishermen in the United States in the last 15 years. One additional factor involved in this tremendous quantity of sales (other than the undeniable quality of the Abu-Garcia reel, per se) lies in the propensity of bass fishermen to aggregate, individually, each a large number of reels. It is estimated that there exists a minimum of 10 million reels of the Garcia-Abu Ambassadeur 5000 and 6000 Series in the United States. Sales of these reels continues.

Since the introduction to the United States market of the said Garcia-Abu reels, new and effective bass lures have been developed which, for best results, require what has come to be known as a "fast retrieve." That is, the bait must be pulled in or retrieved by the bass fisherman at a greater rate of speed than that provided by comfortable operation of the conventional reels in order to obtain maximum results from these new lures. Within the last several years, there have been developed high speed or fast retrieve reels which achieve (without inconvenience or discomfort to the fisherman) the quicker return of the cast bait or lure.

The Garcia Corporation itself, in its Ambassadeur 5500 C and 6500C, as well as the Ambassadeur 7000, has now provided to the public fast retrieve reels which, instead of the conventional 3 and ¾ to 1 retrieve ratio of the classic Ambassadeur reels, provide the new and desired 4.44 to 1 retrieve ratio. While these new reels not only provide the desired higher retrieve gear ratio, but also incorporate the unrivaled Abu-Garcia quality, nevertheless, the bass fisherman who already possesses an armory or array of Abu-Garcia Ambassadeur 5000 and 6000 bait casting reels is faced with the necessity of (if he desires to own fast retrieve reels) purchasing a whole new set of expensive, though quality reels. Abu-Garcia has not provided any means by which the millions of Abu-Garcia Ambassadeur 5000 and 6000 reels already sold and in use may be readily, simply and accurately transformed from the conventional slow retrieve bait casting reel to fast retrieve reels without changing the other parts of the reel.

With the life of the quality Garcia Ambassadeur 5000-6000 reels indefinite with minor care and maintenance, it is evident that there is a considerable need for means to quickly, simply and cheaply enable the transformation of these already existent highest quality bait casting reels to the new and desired fast retrieve reels which give best results in fishing. Preferably, such means would comprise the mere substitution of a few parts, which parts would not require any change or adjustment of the other part of the Garcia-Abu Ambassadeur 5000 and 6000 reels, which parts would be universal to all the already sold reels and, finally, which parts would maintain the quality structure and function of the Abu-Garcia reels at their present high level quality without any diminution in their life expectancy. Yet further, it would be optimum if such substitute parts could be themselves replaced, as desired, with a minimum of work and effort by the fisherman to transform the reel, if desired, back to the original slow retrieve gear ratio for other fishing uses.

OBJECTS OF THE INVENTION

An object of the instant invention is to provide improvements in fishing reels having the structure of and functioning as disclosed in one or more of the patents to Borgstrom 2,489,447, issued Nov. 29, 1949 for "Braking Device for Fishing Reels"; Murvall 2,652,991, issued Sept. 22, 1953 for "Fishing Reel" and Murvall 3,532,296, issued Oct. 6, 1970 for "Line Spool Braking Device for Fishing Reels."

Another object of the invention is to provide novel and improved insert gears for the Ambassadeur 5000 and 6000 Series reels of the Garcia Corporation of 329 Alfred Avenue, Teaneck, N.J. which will so change the gear ratio of the said reels and so transform the reels as to be able to achieve a fast retrieve therewith, whereby to permit the employment of certain types of novel fishing lures therewith, which lures could not be effectively employed with the original Garcia Ambassadeur 5000 and 6000 Series reels.

Another object of the invention is to provide substitute pinion gears for the said existing Garcia Ambassadeur 5000 and 6000 Series reels which not only will effect a fast retrieve, but also retain all of the desired functions of the said Garcia reels as set forth and shown in the above listed patents.

Another object of the invention is to provide insert gearing for the Garcia Corporation Ambassadeur 5000 and 6000 Series reels, which gearing, when inserted, transforms the said reels to fast retrieve reels (gear ratio 4.44 to 1) from the slow retrieve ratio (3.75 to 1) without changing any of the other parts or internal or external structure of the reels, the substitution of the new gearing being quick and easy, the reel readily being transformable back to its original gear ratio when desired (by replacement of the original pinion gears).

Another object of the invention is to provide such substitute gearing for the said Garcia Corporation Ambassadeur 5000 and 6000 Series reels which will transform said reels to fast retrieve reels without any loss of strength in the gearing and without any chatter or vibration in the operation of the reel.

Another object of the invention is to provide a novel, improved, strong and effective gear, shaft and clutch configuration in one piece which is readily insertable with another mating main gear in the Garcia Company Ambassadeur 5000 and 6000 Series reels whereby to immediately, without any other change to the structure, parts or arrangement of parts of the said reels, transform same from slow retrieve to fast retrieve type reels.

Another object of the invention is to provide a novel method of manufacturing a reinforced, integral pinion gear, shaft and clutch configuration which, when inserted into the Garcia Corporation 5000 and 6000 Series Ambassadeur reels, with another mating main gear transforms same from slow retrieve to fast retrieve reels.

Other and further objects of the invention will appear in the course of the following description thereof.

DESCRIPTION OF THE DRAWINGS

In the drawings, which form a part of the instant specification and are to be read in conjunction therewith, embodiments of the invention are shown (as applied in a Garcia Ambassadeur Series reel) and, in the various view, like numerals are employed to indicate like parts.

FIG. 1 is a side view of a Garcia Ambassadeur reel of the type in which the improved integral pinion, shaft and clutch member and mating master gear are inserted to transform the reel from slow retrieve to fast retrieve.

FIG. 2 is a view taken along the lines 2—2 of FIG. 1 in the direction of the arrows.

FIG. 3 is a view taken substantially along the lines 3—3 of FIG. 2 in the direction of the arrows, (showing the improved pinion gear and clutch member in a lower or down position on a shaft carrying same whereby the reel is set for retrieve operation) some parts omitted for clarity in the view.

FIG. 4 is a fragmentary view with parts omitted like that of FIG. 3 but taken from the other direction and with the improved pinion gear and clutch member in raised or disengaged position, so that the reel may spin free of the drive for casting purposes.

FIG. 5 is a view like that of FIG. 4 with the pinion gear and clutch member in lowered or down position.

FIG. 6 is a view taken along the lines 6—6 of FIG. 4 in the direction of the arrows.

FIG. 7 is a side view of a modified form of the improved pinion gear and clutch construction.

FIG. 8 is a plan view of the main substitute gear (looking down thereon) as in FIG. 2 or from right to left in FIG. 3.

FIG. 9 is a side section of a modified form of collar (with beveled edges) employed to fit down over the pinion gear structure of FIG. 7.

STRUCTURE AND FUNCTION

The instant improvement and invention is directed to the substitution of two drive gears into the existing Abu-Garcia reel configuration in the Abu-Garcia Ambassadeur 5000 and 6000 Series. There is no change in the internal construction of the Abu-Garcia Ambassadeur 5000 and 6000 Series reels other than this gear substitution. Therefore, the conventional, known and commercial reel configuration of these reels will not be described in detail, other than is necessary for the understanding of the gears which are employed in the existing Abu-Garcia construction. The internal construction of these reels, with minor differences, is seen in the patent to Murvall, U.S. Pat. No. 2,652,991, issued Sept. 22, 1953 for "Fishing Reel." The patent to Borgstrom U.S. Pat. No. 2,489,447, issued Nov. 29, 1949 shows a braking device for fishing reels which is also incorporated in the Abu-Garcia Ambassadeur reels in question.

Turning to the drawings, the bait casting reel here involved consists of a frame generally designated 10 comprising two laterally spaced housings 11 and 12 which are spaced apart from one another in conventional fashion by struts or beams 13. Fixed to two of the beams in conventional manner is an arcuate elongate plate 14 adapted to be removably fixed to a fishing rod (not shown).

Detailed in FIGS. 2–5, inclusive are a certain amount of the internal construction of the bait casting reel of FIG. 1, specifically that structure seen in the housing 12. This particular construction relates to the clutch mechanism for disconnecting the spool from the driving mechanism, including an automatic reengaging device for the clutch, and particularly the gearing communicating between the shaft carrying the spool and the shaft connecting to the wind-up handle.

In the Garcia Ambassadeur 5000 and 6000 Series reels, the mechanism in the housing 11 typically involves a mechanical brake (not detailed in these figures), the tension of which may be adjusted (for lure weight) by means of the knurled knob 15 seen to the left in FIG. 1. The instant improvement does not relate to any of the bearings, gearing or construction involved in or related to the mechanism in or associated with housing 11 and knurled knot 15 and thus same will not be described. Suffice it to say that the main reel shaft (which carries the spool with the fishing line thereon) is received in suitable bushings and bearings associated with housing 11. Main shaft 16 is also referred to as the spool axle and the fishing line carrying spool, which removably slips thereon, rotates with said spool axle in both directions and does not at any time ride free thereon.

The right hand end of spool axle or main shaft 16 is seen in FIGS. 2–5, inclusive of the drawings. Spool axle 16 carries fixed thereto at each end thereof arcuate spool discs 17 which serve to confine the line therebetween.

Looking at the end housings 11 and 12, same are made up of inner hollow centered circular discs 18 and 19. To the right (in the view of FIGS. 1 and 3) of disc 19 there is removably positioned a circular plate 20 which carries on the inboard side thereof circular flange 21 (extending to the left in FIG. 3) and has a single opening 22 therethrough to receive an extension of the main shaft or spool axle 16, to be described. Plate 20 carries the apparatus seen in FIG. 2 thereon, comprising the clutching mechanism, as well as the drive mechanism interlinking the spool axle 16 with the handle 23. Casing 24 removably encloses the drive and clutching mechanism to be described and has two openings therethrough, namely, 24a for the drive shaft 25 to which handle 23 is fixed and 24b, through which the right hand extension of spool axle 16 (to be described) extends. Housing or cover 24 additionally has a slot 24c therewithin through which a disconnect lever (to be described) extends, as well as hollow sleeve 24d surrounding opening 24a outboard thereof.

The large diameter spool axle 16 extends through spool flange 17 and washer 26. Moving to the right in FIG. 2 and upwardly in FIGS. 4 and 5, there is a lesser diameter portion 16a which has beveled face portions 16b. Opposed elongate rods 27 are the rods of the braking device seen in the Borgstrom U.S. Pat. No. 2,489,447, supra which carry sleeves or weights 27a thereon and cooperate with flange 21 to achieve the braking purposes of the Borgstrom patent. Same will not be here described. Further outboard of the reduced diameter portion 16a of spool axle 16 there is a yet lesser diameter portion thereof, 16c, with a most outboard portion of still less diameter 16d. The latter is received in a bearing carrying cap (not shown) 28 under cover 29.

The novel elements which are here provided comprise the substitute gears which ride on the handle shaft 25 and spool axle portion 16c, respectively. It should be noted that the Murvall U.S. Pat. No. 2,652,991 (particularly see FIGS. 1 and 2), shows the conventional slow retrieve gearing mounted on equivalent shafts in roughly equivalent reel operating part construction. However, it should be noted that the drawings in the Murvall U.S. Pat. No. 2,652,991 are over 20 years old and thus the operating parts of the Abu-Garcia reel illustrated in the instant specification differ somewhat (but not in principle) from those parts seen in Murvall U.S. Pat. No. 2,652,991.

As a specific example, the Murvall 2,652,991 drawings and disclosure do not show the braking device of Borgstrom 2,489,447 supra, incorporated therewith as is here shown and has been described with respect to FIG. 2.

However, the novelty and improvement with respect to which the instant specification is directed is not to be found in any of the parts of the conventional updated representations of the Abu-Garcia reel here shown, but only in the cooperating gear configuration to be described which transforms the said conventional Abu-Garcia 5000–6000 Series reel to a fast retrieve reel. Nevertheless, the structure and operation of the handle drive shaft and the means for translating the improved pinion bear-clutch construction to be described along the spool axle portion 16c will be sufficiently described so that the operation of the reel and the insert paired gear construction can be clearly understood.

Turning to the handle carrying shaft 25, this shaft comprises an elongate hollow sleeve which is rotatably mounted upon a center post 30 secured to plate 20. Ratchet disc 31 having bearing studs 32 on the inboard side thereof is fixed to the inboard end of sleeve shaft 25. Main drive gear 33 is rotatably received on circular section portion 25a of shaft 25. The outboard face of main gear 33 is recessed and receives ramped spring 34 in the recess. Toothed member 35 (see FIG. 3) is received on non-circular portion 25b of shaft 25, whereby to rotate therewith overlying the ramped spring 34. Post 36 carries ratchet arm 37 which prevents ratchet wheel 31 from rotating in a counter-clockwise direction in the view of FIG. 3 (and thus shaft 25 from rotating in that direction. Engagement of the teeth of toothed wheel 35 by the ramped spring 34 prevents counter-clockwise rotation of the toothed wheel member 35 (and thus shaft 25) in the view of FIG. 3. Spacer 38 is positioned on shaft portion 25b outboard of toothed member 35. The most outboard portion 25c of shaft 25 is externally threaded.

Finger grip handle attachment 39 and handle 23 are threaded and mounted (respectively) on the outboard section of shaft 25, the latter secured by nut 40.

A pair of upright posts 41 and 42 fixed to the outboard surface of plate 20 carry grooved sleeves 43 and 44 thereon.

Two locking arms 45 and 46 are pivoted on studs (not seen) on plate 20 under gear 33 in FIG. 3 and carry tabs 45a and 46a thereon engaged by springs 47 and 48, respectively, the other ends of which springs engage shafts 42 and 41, respectively. The studs 32 on ratchet wheel 31 (as shaft 25 is rotated by handle 23) operate to cam apart locking arms tabs 45a and 46a (from one another) to the position they occupy in the showing of FIG. 3 for a purpose to be described.

A U-shaped clip 49 is fixed to the outboard surface of plate 20 and carries between the U-legs thereof shaft 50. Pivotally mounted on shaft 50 is arm 51 which has horseshoe engaging arms 51a and 51b at the end thereof.

Trigger lever 52 extends under arm 51 in the left hand portion thereof in the view of FIG. 3 dividing into legs 52a and 52b having studs 52c and 52a thereon which always remain inside of the lever arm portions 45a and 46a. Lever 52a is spring loaded for return to the position of FIG. 2. Thus stud 53 is fixed to plate 20 is connected to stud 54 on leg 52a of lever 52 by spring 55.

The upshot of all of this structure, which is conventional, peculiar to Abu-Garcia Ambassadeur 5000 and 6000 Series reels and essentially described in the Murvall U.S. Pat., No. 2,652,991 supra, is that, when the fisherman presses lever 52 from left to right in the view of FIG. 3, the arms 52a and 52b and the central bar therebetween move also from left to right in the view of FIG. 3 under arm 51. The latter, pivoted on shaft 50 in clip 49, is raised (in the right hand portion thereof in the view of FIG. 3) toward the observer because the U-shaped right hand portion of lever 52 abuts the underside of the right hand portion of arm 51. This means that arms 52a and 52b move toward the observer (in the view of FIG. 3) moving the small pinion gear 56 also toward the observer. This action is viewed in its two stages in FIGS. 4 and 5 with FIG. 4 showing the member 51 in its downward position corresponding to the showing of FIG. 3, while FIG. 5 shows member 51 and the arms 51a and 51b in the upward position after lever 52 has been moved from left to right in the view of FIG. 3.

The whole purpose of elevating the arms 52a and b away from plate 20 is to slide the pinion gear-clutch member (slidably mounted on spool axle portion 16c) outboard in the view of FIG. 2 to disengage a clutch member from the beveled face portion 16b of spool axle 16. This action, as noted, is seen in FIGS. 4 and 5 with respect to the novel gearing provided in the instant improvement.

Turning to the subject improvement, same resides largely in the manufacture of, as well as structure of, the very small pinion gear generally designated 56. While it is true that the main gear mounted on shaft 25 (gear 33) differs from the main gear seen in Murvall 2,652,991, it differs only in greater diameter and having a greater number of teeth. This gear (being fairly large, thus easy to fabricate and handle) is no problem to supply in such configuration as to provide the proper size, the proper number of teeth and the groove on its outboard face carrying the ramped spring 34, whereby to readily be mounted on handle shaft 25 of the Garcia reels of standard conventional type to be transformed to fast retrieve reels.

Turning now to the preferred pinion gear construction seen in FIGS. 4, 5 and 6, same comprises an upper main gear portion 56a, an intermediate smooth shank section 56b and lower, inboard portions 56c and d. The latter are encircled and positively engaged by collar 57 forcibly seized thereon. Centrally of main pinion gear portion 56a, as well as shank portion 56b and extending through part 56c there is a bore or orifice 58 by virtue of which gear 56 slidably mounts on the shaft 16 portion 16c. The more inboard 56d of the basic pinion gear construction, comprises a pair of downwardly extending flanges received within the collar 57. These flange portions 56d serve to alternately engage the beveled portion 16b of shaft 16 and disengage therefrom, whereby to alternately disconnect shaft 25 from shaft 16 in the casting and reeling in operations. That is, the gear teeth of main gear 33 and pinion gear portion 56a are never entirely disengaged from one another and rotate together, one with the other. However, when the lever 52 is pushed inwardly, the member 51 is elevated in the view of FIG. 2 (toward the observer) around shaft 50, (moved clockwise around shaft 50 in FIG. 3 and moved counterclockwise from the position of FIG. 5 (upwardly) to the position of FIG. 4) so that members 56d disengage from the beveled portion 16b of shaft portion 16a of shaft 16. This permits the shaft 16 to run free without rotating gear portion 56a and thus without rotating gear 53 or shaft 25.

The Garcia Corporation basic (main) gear employed 57 teeth, while the Garcia pinion employed 16 teeth. The instant improvement increases the outer diameter of main gear 33 and also increases the number of teeth to 70. At the same time the outer diameter of pinion gear portion 56a is decreased with a decrease in the number of teeth to 15. These changes transform the 3.75:1 slow retrieve ratio to the 4.44:1 fast retrieve ratio.

Looking at the new Garcia Corporation Ambassadeur 5500C and 6500C fast retrieve reels, it is noted that the Garcia Corporation redesigned its reel to a certain extent to achieve the fast retrieve, rather than producing two new gears which enable owners of the older Garcia slow retrieve reels to change over without the expense of purchasing a new reel. Thus, the new Garcia fast retrieve reel has an engagement of the arms of the brake, rather than the shaft. The bearing surfaces on the shaft were removed. A collar has been inserted to receive the fork to engage and disengage the gears. As noted, these basic structural changes result in the requirement that a new, expensive, fast retrieve reel be purchased from the Garcia Corporation without the option of having (alternatively) slow and fast retrieve reels.

It perhaps should be noted that the main difference between the Garcia 5000 and 6000 Series reels is a difference in spool capacity.

Even the Garcia Corporation redesign reels (5500C/6500C reels) employ a larger pinion gear than the instant improvement. The Garcia new pinion gear outer diameter is 0.276 inches. The subject improved pinion gear, having the same number of teeth, is of dimension 0.265 inches plus nothing or minus 0.001 inches.

Depending on the outer diameter of the shaft portion 16c, the improved pinion gear may be provided in two variations, differing only in the inner diameter of bore 58. This may be 0.126 plus or minus 0.0005 inches or 0.138 plus or minus 0.0005 inches. The Garcia 5000A and 5000C reels have different diameters for shaft portions 16c.

The overall height of pinion gear element 56 is 0.409 plus 0.000 inches and minus 0.005 inches. The height of the main gear portion 56a is at least 0.187 inches. The height of the combined secondary gear portions 56c and 56d are 0.115 inches. The height of shank portion 56b is 0.107 inches. The outer diameter of the pinion gear member 56a is 0.265 inches. The outer diameter of the shank portion 56b is 0.185 plus or minus 0.002 inches. The height of inboard portion 56d (from the inboard face of portion 56c) is 0.090 inches. The gear element 56 is formed from 0.350 inch diameter stock. The depth of the gear tooth cuts in the pinion member 56a are 0.036 plus or minus 0.0005 inches.

The purpose of the collar 57 is to provide strength in the lower portion of the pinion gear assemblies 56. That is, it is necessary when cutting the gear teeth in the basic pinion portion 56a to also cut like gear teeth or approximations thereof in any closely nearby, like diameter structure. When this is done (as in FIG. 7 to be described), the lower portion of the pinion assembly 56 (in portions 56c and 56d) then becomes weakened. It must be borne in mind that, in the process of fishing, loads are applied to both inner faces of member 56d and thus to their connection to portion 56c. In order to provide a lifetime pinion gear which will not require replacement, the collar 57 is employed in the finished pinion gear and the manufacture thereof as will be described. The outer diameter of the collar is irrelevant in the Garcia reel system shown, that is, it is not critical. The inner diameter is critical.

Turning to FIG. 7, therein is seen a pinion gear assembly generally designated 56'. Gear assembly 56' has upper working pinion gear portion 56a', shank or bearing portion 56b', inboard portion 56c' and bearing skirt portions 56d'. The center bore 58' (of either diameter given above) passes through portions 56a', 56b' and 56c'.

In the manufacture of the pinion gear assembly 56' (or, for that matter 56), one starts with 0.350 inch stock. The outer diameter of the upper portion 56a', after machining or cutting of the gear teeth is 0.265 plus or minus 0.0005. The most inboard portion of bearing portions 56d' are approximately 0.060 inches lesser diameter than the outermost diameter of portion 56d. This gear element, as formed and seen in FIG. 7 is workable and operable. However, it is more vulnerable to load stresses than is desirable for a lifetime insert gear. From the top (FIG. 7.) of portion 56c' to the bottom of portion 56d', the outer diameter varies from 0.265 inches to 0.325 inches.

With this taper of 0.060 inches (or slightly more) after the residual cutting of the gear teeth in the portions 56c' and 56d', it then becomes possible to utilize this flared skirt in the portions 56d' to fix collar 57' on the pinion assembly 56'. This is accomplished by providing a collar 57' of an internal diameter slightly greater than the outer diameter of the upper portion 56a' and also the beginning of portion 56c'. The collar ID however is less than the OD of the inboard portion of flanges 56d'. Thus, this greater internal diameter collar is passed down over the upper working gear 56a into contact with the outwardly diverging walls of gear portion 56d' and then forced downwardly thereover (caving in the partially cut gear teet into the grooves therebetween to form a continuous wedging contact). The collar height is preferably greater than that of portions 56c' and 56d', namely, 0.125 inches to insure non-chattering fork ride thereon. Once the collar is forced onto the gear assembly 56', over the inboard portions 56c' and 56d' thereof, the internal bore 58' must be reamed because there is a compression of the order of 0.0002 inches involved.

Beveling of the upper edge of the collar 57 (in the views of FIGS. 4 and 5) minimizes noise and chatter with respect to the member 51 and its split ends 51a and 51b. A plastic collar may be added (split collar) encircling the shank portion 56b' if desired. This totally controls noise.

In order to transform the said Garcia 5000-6000 Series reels to fast retrieve reels, the two gears 33 and 56 are merely inserted replacing their counterparts in the original Garcia reel without any disturbance of any of the other parts. This accomplishes all of the desired objects. By retaining the original gears, same may be replaced at any time if a slow retrieve reel is desired.

FIG. 8 shows a plan view of the main insert gear 33 which cooperates with the pinion portion 56a. The recessed spring 34 may clearly be seen. This gear differs from the main drive gear of the Garcia Reels only in (1) a greater outer diameter and (2) the presence of a greater number of teeth thereon. Thus, the Garcia main drive gear has 57 teeth, while the improved drive gear 33 has 70 teeth. The outer diameter of the Garcia main gear is 1.125 inches, while the outer diameter of the improved drive gear is 1.200 inches. This increase in outer diameter is outboard of the spring receiving channel at the base of the teeth.

With the increase in the outer diameter on the main drive gear, there is a decrease in the outer diameter of the pinion gear and a slight decrease in the number of teeth. Thus, the number of teeth in the Garcia main gear is 16, while there are 15 teeth in the improved pinion gear. The outer diameter of the Garcia upper and lower pinion gears is 0.345 inches, while the outer diameter of the improved upper pinion portion of the instant invention is 0.265 inches.

Turning to FIG. 9, therein is shown an optimum beveled collar generally designated 60. Collar 60 has a lower face 60a and an upper face 60b. The lower bevel is designated 60c, with the upper bevel designated 60d. The internal bore of the collar (61) has a break edge 61a. Lower and upper with respect to the collar refer to the orientation of the pinion gear assembly of FIG. 7.

Turning to the dimensions of the optimal double beveled collar, the height of the collar is 0.125 inches plus or minus 0.002. The height of the flat outer face of the collar between bevels 60c and 60d is 0.085 inches plus or minus 0.015. The internal bore of the collar is 0.280 inches plus or minus 0.0005. The overall outer diameter of the collar is 0.365 inches plus or minus 0.005. The upper flat face 60b is 0.025 inches plus or minus 0.010. The lower flat face 60a is 0.015 inches plus or minus 0.010. The break edge 61a is 0.012 inches maximum. Alternatively, the inside collar bore may be tapered from a greater internal diameter upwardly to a lesser upper internal diameter to fit over the tapered outside surface (0.060 inches total taper) of pinion gear assembly portions 56c' and 56d'.

There are other reels which recently have gone on sale in the United States whose internal structure is a substantial copy of the designated Garcia reels (Daiwa, Shakespeare and Heddon, for example). These gears will also substitute in such reels. However, the number of such reels present in the United States is minuscule compared to the numbers of the Garcia reels in the United States.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. An integral pinion gear construction for insertion into a Garcia-ABU 5000-6000 Series reel comprising a longitudinally bored member including:
   a first outboard gear bearing portion of a first uniform outer diameter,
   an intermediate shank section of a second, lesser outer diameter, and
   a third inboard portion of increasing outer diameter starting equal to the first portion next the shank and flaring to a greater outer diameter at the inboard end thereof,
   the third portion internally relieved at the lower end thereof for engagement with the spool shaft clutch of the said reel.

2. A gear construction as in claim 1 wherein the outer diameter of the first portion is substantially 0.265 inches and the greatest outer diameter of the third portion is substantially 0.277 inches, there being 15 teeth in the first portion.

3. A gear construction as in claim 1 including a cylindrical, hollow collar seized over the third portion of a height equal to the said third portion, the collar of an internal diameter intermediate the outer diameter extremes of the said third portion.

4. A gear construction as in claim 3 wherein the collar ends are beveled.

* * * * *